(12) United States Patent
Pearce

(10) Patent No.: US 12,309,317 B2
(45) Date of Patent: May 20, 2025

(54) SYSTEM AND A METHOD OF USING SEQUENTIAL NUMBERING TO DETECT A FRAUDULENT TELEPHONE CALL WITHIN A TELEPHONE SYSTEM

(71) Applicant: PHISHFLAGGER INC., Toronto (CA)

(72) Inventor: William Pearce, Cornwall (CA)

(73) Assignee: PHISHFLAGGER INC., Toronto (CA)

( * ) Notice: Subject to any disclaimer, the term of this patent is extended or adjusted under 35 U.S.C. 154(b) by 0 days.

(21) Appl. No.: 18/937,050

(22) Filed: Nov. 5, 2024

(65) Prior Publication Data

US 2025/0133162 A1   Apr. 24, 2025

Related U.S. Application Data

(63) Continuation of application No. PCT/IB2024/056562, filed on Jul. 5, 2024.

(30) Foreign Application Priority Data

Jul. 5, 2023 (IN) .............. 202311045176

(51) Int. Cl.
*H04M 3/22* (2006.01)
*H04M 3/42* (2006.01)

(52) U.S. Cl.
CPC ..... *H04M 3/2281* (2013.01); *H04M 3/42042* (2013.01)

(58) Field of Classification Search
CPC .............. H04M 3/2281; H04M 3/42042
USPC ............. 379/142.01, 42.05, 142.17
See application file for complete search history.

(56) References Cited

U.S. PATENT DOCUMENTS

| 2010/0274857 | A1* | 10/2010 | Garza | G06F 11/08 709/206 |
| 2015/0088999 | A1* | 3/2015 | Carr | H04L 51/23 709/206 |

* cited by examiner

*Primary Examiner* — Binh Kien Tieu
(74) *Attorney, Agent, or Firm* — Rivka Friedman

(57) ABSTRACT

Disclosed herein is a method of verifying the authenticity of telephone calls from a caller to a recipient, the telephone calls having a caller's telephone number and recipient's telephone number, respectively, and an accessible field within the caller ID system for receiving content. The method includes the steps of first identifying the recipient for a call to be made by the caller. A current sequence marker for the recipient is then generated. The current sequence marker represents the next sequence identifier in a sequence of telephone calls between the caller and the recipient. The current sequence marker is then inserted into the accessible field of the caller ID information for the telephone call and the call is then placed to the recipient. Potentially fraudulent telephone calls are flagged for the recipient to help prevent telephone-based phishing and other phone fraud attempts. The content of the caller ID information within the accessible field may be visible to the recipient upon receiving a telephone call or other alert messages or warnings such as a text message, a differentiated right tone, colored lights, flashing lights, an audio signal, an audio message, or other means may be presented to the call recipient to warn them before the telephone call is answered.

20 Claims, 2 Drawing Sheets

SYSTEM AND A METHOD OF USING SEQUENTIAL NUMBERING TO DETECT A FRAUDULENT TELEPHONE CALL WITHIN A TELEPHONE SYSTEM

FIELD OF THE INVENTION

The present invention relates to telecommunication. More particularly, the present invention pertains to methods for verifying the authenticity of telephone calls by tracking and confirming the sequential history of calls between parties, utilizing sequence markers in caller ID information to ensure the integrity and authenticity of the communication.

BACKGROUND OF THE INVENTION

People rely on telephone system communications and caller ID display systems for many important purposes, including ensuring that loved ones are safe and secure. In the modern world, fraudsters use AI and other technologies such as 'robocalls' to create fake voices of people to engage in ransom and other illegal activities using the telephone system.

In a typical ransom attack using 'deep fake' voices, a ransomer 'spoofs' the telephone number, for example, of a child in a family. This may be accomplished in any of several ways, but the result is a family member, such as a parent or grandparent, receives a telephone call from the ransomer that appears to be coming from the child's phone. The ransomer demanding a ransom say they are holding the child, To prove the same a deep faked, AI-generated, or AI-assisted artificial voice that sounds to the listener as that of their child in distress is played. The ransomer instructs the family member to withdraw cash from a bank and deposit it at a specified location for pickup, with the promise the child would be released unharmed. Such fake calls with fake voice are more distressing and convincing to the family member as the telephone's caller identification (ID) display system shows that the call is originating from the child's phone, even when it is originating from a different telephone number. These types of ransom attacks can be devastating to victims.

Typically, a telephone system provides the caller ID over the telephone line's communication signal to the telephone hardware, which detects and displays the caller ID (usually a phone number or name of a contact, or 'unknown caller' in some cases when the number is not known) on the telephone hardware to a user. The telephone system may be under the direct control of the telephone service provider for the originating caller or may include interoperation with the receiving telephone system of the person receiving the telephone call and seeing the fraudulent caller ID displayed.

Further, these types of telephone calls usually originate from a fraudster's telephone, operating within a telephone system, and are routed to the victim's phone by the sending and receiving carriers using standards or proprietary methods for transporting telephone calls, as per rules set within the telephone systems involved in placing and receiving the calls.

Telephone systems may be PSTN/POTS, cellular, digital, VOIP, a proprietary system, or some combination thereof. The caller ID may be provided to the person receiving a voice call after the receiving carrier queries a CNAM database to determine the name associated with a phone number, or through other means of providing a caller ID. Before the call is connected, the recipient's telephone network decodes the caller's number and delivers it to the recipient's phone. This may be done using a specific signaling protocol, such as the Bellcore GR-30-CORE in North America, or the ETSI FSK signaling in Europe, or other protocols. In either case, the effect is the same: the provision of caller ID display within the telephone system so the voice call recipient can know the identity of the person placing the call.

Attempts to impersonate or masquerade as legitimate spoofed phone numbers can evade the conventional filters and identifiers within the telephone system's caller ID functionality and have the potential to arrive without detection on the telephone displays of targeted phone call recipients.

Therefore, there is an unmet need to identify fraudulent telephone calls and help telephone users not be deceived by phone calls that appear to be legitimate but are ransom attempts or other fraudulent calls originating from bad actors with nefarious intents and purposes, such as calls with a forged caller ID spoofed to appear from another caller or other telephone-based fraud attempt techniques.

OBJECTIVE OF THE INVENTION

An objective of the present invention is to provide a method and a system that provides a reliable means to authenticate the caller's identity by verifying the authenticity of telephone calls between a caller and a recipient to ensure the integrity of the communication by confirming the sequential history of calls.

Another objective of the present invention is to provide text displays or audio alerts, or both, to phone call recipients when non-verifiable caller ID information is received to help protect recipients from potentially fraudulent telephone calls.

Another objective of the present invention is to implement a system for tracking and confirming the sequential history of calls between parties to ensure the order and integrity of communications. It will provide a reliable means to verify the sequence of calls.

One more objective of the present invention is to enhance caller ID information by incorporating sequence markers, ensuring the integrity and authenticity of the communication, thereby, providing a reliable way to verify caller identity and confirm the legitimacy of incoming calls.

One more objective of the present invention is to prevent phone fraud by flagging potentially fraudulent calls, aiding in the prevention of telephone-based phishing and other scams to protect recipients from deceptive practices.

Another objective of the present invention is to improve recipient awareness by enabling them to view authenticity information in the caller ID without answering the call thereby verifying the legitimacy of incoming calls at a glance or by hearing an audio warning about potentially illegitimate calls before the call is answered. The present invention provides protection for phone calls in real-time, as phone calls are received, so call recipients are warned about potentially suspicious or fraudulent telephone calls before the recipient answers the call and before the recipient is able to hear or speak on the telephone call being received.

Another aim of the present invention is to ensure markers are easily readable and utilize alphanumeric sequences in caller ID that are clear to recipients. This approach facilitates quick verification of call authenticity.

SUMMARY OF THE INVENTION

The present innovation would assist in identifying potential fraudulent phone calls within a telephone system. Any telephone call receiver would benefit from this innovation, but telephone system owners, in particular, would benefit by increasing the safety and security of their telephone environment against spoofing and fraud attempts, thus allowing their end-users to communicate more freely and reducing their concerns about impersonation and fraud attempts.

The disclosed system enables a method for verifying the authenticity of telephone calls between a caller and a recipient, where both parties have phone numbers and access to a caller ID system. The method involves utilizing an accessible field in the caller ID system that displays content visible to the recipient upon receiving a phone call. The method comprises the steps of identifying the receiver for a phone call to be made by the caller, generating a current sequence marker for the recipient that represents the next sequence identifier in a sequence of telephone calls between the caller and the recipient, and inserting the current sequence marker into the accessible field of the caller ID information. This information is then included in the caller ID information presented to the phone call recipient by the caller ID system or by the caller ID system interoperating with the telephone device and the telephone system.

In an embodiment, the current sequence marker is generated from a phone call history representing a record of telephone calls previously made from the caller to the recipient.

In an embodiment, the current sequence marker comprises one or more characters selected from the group of sequential characters comprising letters, numbers, words from a sequential list of words, symbols from a sequential list of symbols, icons from a sequential list of icons and images from a sequential list of images.

In another embodiment, the telephone call history is contained in a database coupled to a caller's telephone system.

In yet another embodiment, the database and caller ID application are configured to programmatically generate the current sequence marker and insert it into an accessible field before transporting the call and the caller ID information.

In an embodiment, the caller's telephone system queries a telephone call history to generate the current sequence marker, the telephone call history representing a record of telephone calls previously sent from the caller to the recipient, the caller then inserts the current sequence marker into the accessible field of the caller ID information before transporting the voice call to the recipient.

In another embodiment, the telephone call history includes a last sequence marker for a last phone call made and sent to the recipient, the telephone system generates the current sequence marker by incrementing the last sequence marker by 1.

In a further embodiment, the accessible field into which the current sequence marker is inserted into the caller ID information for a phone call.

In another embodiment, the recipient receiving the phone call made by the caller, the current sequence marker being identified from the caller ID information, the current sequence marker then being compared to an expected sequence marker predicted from the last sequence marker, the telephone call being flagged as suspicious if the current sequence marker identified from the call's caller ID information does not match the expected sequence marker.

In a further embodiment, the current sequence marker is a human-readable alphanumeric sequence of characters.

In another embodiment, caller and recipient databases coupled to the caller and recipient's called ID databases containing fields for the telephone numbers of callers and recipients, the last sequence identifier used in a sequence of telephone calls, the current next sequence identifier to be used for the next call in the sequence of telephone calls, the caller ID databases being further configured to automatically update the current sequence identifier in the sender's caller ID database to reflect the making of the phone call when the telephone call is made by the caller, and to automatically update the predicted sequence identifier in the recipient's caller ID database in the event the sequence identifier extracted from the caller ID information for the phone call received matches the predicted sequence identifier fetched from the recipient's caller ID database.

In an aspect of the invention, a method of verifying the authenticity of telephone calls sent from a caller's telephone to a recipient, both caller and recipient each having a phone number and access to a caller ID system with an accessible field for receiving content, the content of which is visible to the recipient upon receiving a phone call, comprises the steps of identifying the receiver for a phone call to be made by the caller, generating a current sequence marker for the recipient that represents the next sequence identifier in a sequence of telephone calls between the caller and the recipient, inserting the current sequence marker into the accessible field of the caller ID information, and including that in the caller ID information presented to the phone call recipient by the caller ID system or the caller ID system interoperating with the telephone device and the telephone system, and then placing the phone call. Upon receiving the call, the method includes identifying the caller ID information of the caller, identifying the current sequence identifier from the caller ID information for the call, generating a predicted sequence identifier for the caller, comparing the current sequence identifier in the phone call's caller ID information to the predicted sequence identifier, and flagging the voice call as suspicious if the sequence identifier identified from the caller ID information for the call does not match the predicted sequence identifier.

In a further embodiment, the accessible field into which the current sequence identifier is inserted is configured such that the recipient can view the current sequence identifier simply by reading the field without having to answer the phone call when it is received, the recipient's telephone or the recipient's telephone coupled with the recipient's telephone system or caller ID system, the telephone is configured to flag the voice call as suspicious if the current sequence marker identified from the caller ID information for the telephone call does not match the expected sequence marker.

In an aspect of the invention, a caller ID system for tracking a plurality of telephone calls from a caller to a recipient, the telephone calls each having a phone number and access to an accessible field, the caller ID system comprises a caller's telephone operatively coupled to a caller ID database. This system is configured to send caller ID information with telephone calls to the recipient, with the caller ID database storing contact information for the recipient, including the recipient's telephone number and a sequence identifier representing the last predicted value in a previously agreed-upon sequence of telephone calls between the caller and recipient. The caller ID database and system are configured to insert the sequence identifier for the recipient in the accessible field of the caller ID information sent with every phone call to each recipient, and to update the sequence identifier for the recipient in the caller ID database when each phone call is sent. Additionally, a recipient telephone operatively coupled to a recipient's caller ID database, with the recipient caller ID application configured to receive said plurality of telephone calls from the caller. The recipient database stores contact information for the caller, including the caller's telephone number and the sequence identifier. The recipient caller ID system is designed to parse caller ID information to extract the sequence identifier from the accessible field sent by the caller. This generates an extracted sequence identifier. The system then retrieves the caller's sequence identifier from the database and compares it to the extracted sequence identifier. If there is a mismatch, the system flags the voice call as suspicious. This can trigger real-time warning messages, either as text displayed on the phone hardware or as an audio message before the call is answered, alerting the recipient that the call may be unverified and potentially fraudulent. Additional alert indicators can include a unique ringtone, a flashing light, colored lights, or an audio signal from the phone. This includes parsing the caller ID information for the phone call to extract the current sequence identifier, identifying the caller of the telephone call in a recipient database, fetching a predicted sequence identifier from the recipient database for the caller, comparing the current sequence identifier extracted from the caller ID information from the phone call to the predicted sequence identifier fetched from the recipient database, and flagging the voice call as suspicious if the sequence identifier extracted from the caller ID information does not match the predicted sequence identifier fetched from the recipient database. In an embodiment, the real-time warning messages may include an audio message inserted by the receiving telecom that plays a warning message for the user after the phone is answered but before the call is connected, or the audio message could be superimposed on the existing connection after the call is answered.

In another embodiment, the caller is within the same telephone system as the recipient.

In another embodiment, a recipient's caller ID system flags telephone calls as suspicious in the event the sequence identifier identified from the caller ID information for the telephone call does not match the predicted sequence identifier, the recipient having a different telephone system than the email caller.

In an aspect of the invention, a caller ID system for receiving telephone calls sent from a caller in a telephone system to a recipient within a telephone system, the telephone calls each having a caller's telephone number, a recipient's telephone number, and one or more accessible fields, the caller ID system comprises the recipient telephone operatively coupled to a recipient database of telephone contacts. The recipient database is configured to store contact information for the recipient, including the caller's telephone number and a sequence identifier, which represents the last predicted value in a previously agreed-upon sequence of telephone calls between the caller and recipient. The recipient database and the recipient telephone are configured to inspect the incoming voice call and identify the sequence identifier for the caller in the accessible field of the caller ID information for each call made to the recipient. The recipient database is further configured to update the sequence identifier for the caller in the recipient database when each call is made to the recipient. The recipient caller ID application, coupled with the recipient database, is configured to receive a plurality of telephone calls from callers and parse the caller ID information for each call to extract the sequence identifier from the accessible field of the caller ID sent from the caller, generating an extracted sequence identifier. The recipient caller ID application and recipient database are then configured to compare the extracted sequence identifier to the predicted sequence identifier in the recipient database. The system either flags the telephone call as suspicious if the extracted sequence identifier does not match the predicted sequence identifier or updates the sequence identifier in the database if this is the first sequence identifier ever received in a phone call from the caller, so future telephone calls can be validated using sequential numbering and the other components and processes of the present invention. If a sequence identifier cannot be parsed or extracted from the caller ID information for a telephone call, the system flags that telephone call as not conforming to the method of using sequential caller ID numbering, and thus as not verifiable or possibly suspicious.

In another embodiment, a recipient's caller ID system flags telephone calls as suspicious in the event the sequence identifier identified from the caller ID information for the telephone call does not match the predicted sequence identifier, and the caller ID system, caller ID database, and the recipient's telephone system retaining a record of potentially fraudulent or phishing voice calls, or other calls where the sequence identifiers do not match, thereby enabling other caller ID systems and other telephone systems to help validate telephone call histories of potentially fraudulent callers.

In another embodiment, a recipient's caller ID system flags telephone calls as suspicious in the event there is incomplete caller ID information for the telephone or there is no caller ID information for a telephone call, or problematic caller ID information from calls passing between incompatible telephone systems or jurisdictions and flagging the telephone call as potentially fraudulent.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings or figures, of which.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. It is to be understood that other embodiments may be utilized, and structural changes may be made without departing from the scope of the invention.

Some embodiments of this invention, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present invention, the preferred, systems and methods are now described.

This invention introduces a method aimed at enhancing the security and authenticity of telephone communications between callers and recipients. By integrating sequence markers into caller ID information, the system tracks and verifies the sequential history of calls. This enables recipients to verify incoming call authenticity without answering, preventing phone fraud like phishing attempts. Human-readable alphanumeric markers ensure clarity and ease of verification, bolstering security in telecommunication environments.

Figure 1:
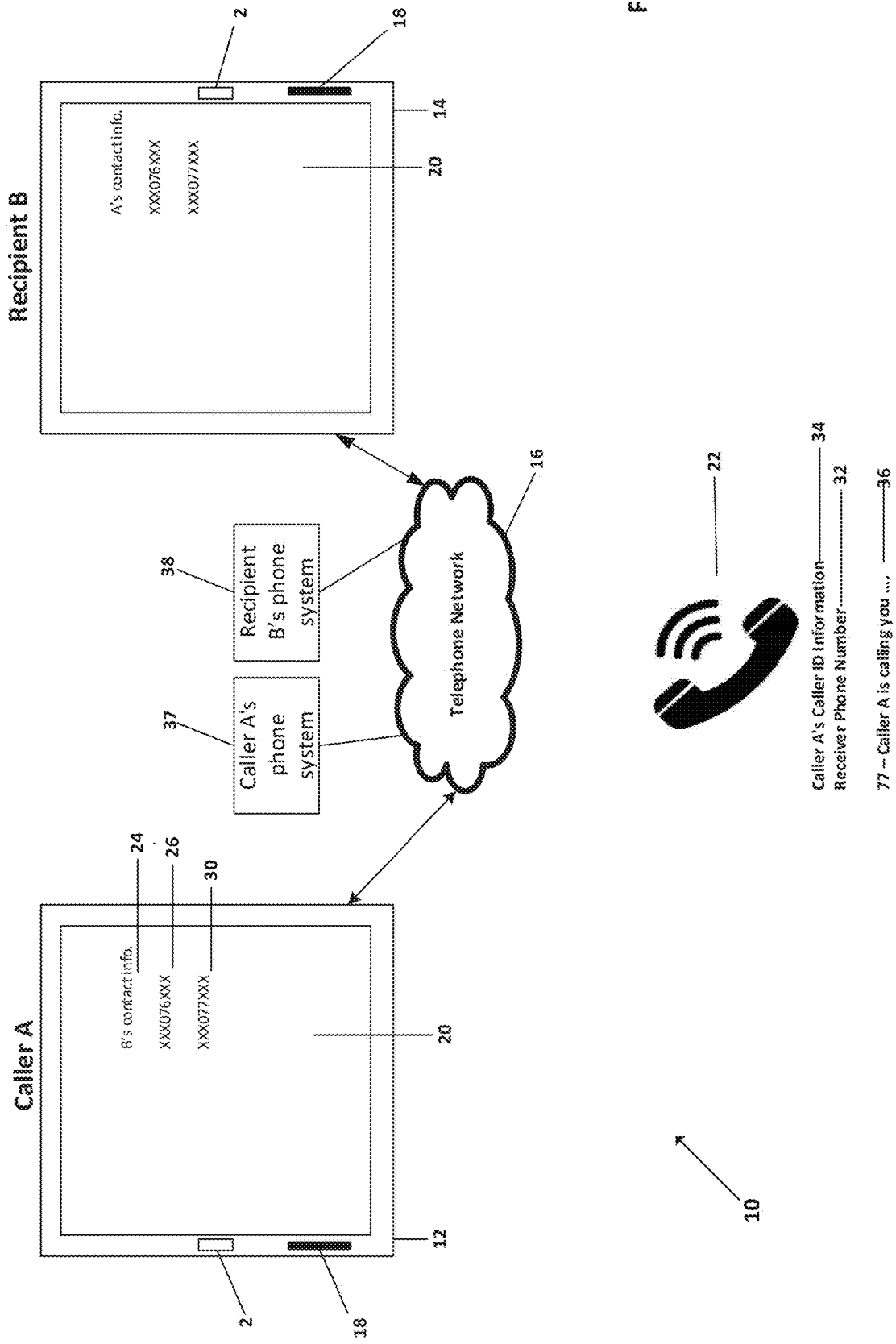
FIG. 1 illustrates a schematic view of the system for identifying potential fraudulent phone calls during a telephone call from Caller A to Recipient B, in accordance with an aspect of the present invention.

In an embodiment, FIG. 1 illustrates how the present invention relates to the exchange of telephone calls between users over a telephone system where caller IDs are used. The system of the present invention, shown generally as item 10, consists of two telephone devices 12 and 14 in communication with each other via a telephone network 16. For most practical applications, network 16 is a telecom network that can transport phone calls between different phone carriers and caller ID information between Caller A and Recipient B but could also be another type of telephone system, such as those with other digital, cellular, mobile, or voice over IP (VOIP) capabilities. Network 16 is capable of facilitating telephone calls from Caller A to Recipient B and may use standard protocols or proprietary methods of transporting phone calls that can send Caller A's call 22 to Recipient B's telephone 14.

Caller A's telephone system 17 and Recipient B's telephone system 38 incorporate processes compliant with the respective protocols and standards for transporting and displaying caller ID information). Data source 20 contains data about telephone contacts and also contains data about the history of previously made telephone calls.

It is essential that data source 20 contains the contact information of call recipients and be operative for the storage and retrieval of sequence identifier 26 for each recipient. Within the present invention, data source 20 could be operative in several forms, including (i) a traditional relational database such as Microsoft SQL Server; or (ii) a delimited text file database containing the contact information of recipients and sequence identifier 26 for each call recipient; or (iii) a data file containing the contact information of recipients and sequence identifier 26 for each recipient; or (iv) a record of previously sent calls (hereinafter referred to as the "telephone history") stored in their native format within, or otherwise 20 accessible by Caller A, Caller A's telephone system 37, and process 2; or (v) some other record of, or copy of, the telephone history that contains the contact information of recipients and sequence identifier 26 for each recipient.

Regardless of whether data source 20 is a traditional database, a data file, or other forms of telephone call history, it is accessible by and interoperable with the other components of the present invention, as described herein. Data source 20 includes data about the components of previously sent phone calls from Caller A to recipients and may also include historical data or other data about previously made calls, including (i) caller ID fields such as the caller's name, and recipient telephone number 24

Regardless of where data source 20 resides, or whether data source 20 is a traditional database or another form of accessible telephone history, its purpose is to contain information about previously made calls, including the telephone numbers 26 of call recipients and sequence identifier 26 for each recipient, or next sequence marker 30 for each recipient, or both sequence identifier 26 and next sequence marker 30 for each recipient. Data source 20 could reside within a caller's telephone 12 or Caller A's phone system 37 or in another location such as the wider telephone network 16 or within a third-party system.

When used in the present invention, if data source 20 is an accessible telephone history of previously made calls the contact information of recipients and also sequence identifier 26 is retrievable or discernible. For example, by reading the telephone history, such as those found in a data folder of previously sent calls within telephone system 37, caller ID application 18 on telephone device 12, Caller A (manually) or process 2 (programmatically) could discern what the next sequence marker 30 would be. Caller A's telephone device 12 is a telephone network-16-enabled device such as a traditional telephone or could be a mobile phone, internet phone, or other type of telephone. Phone device 12 uses caller ID application 18, and possibly also process 2, to make calls to recipients such as Recipient B. In other telephone systems, the caller ID application 18 may be accessed by Recipient B's phone system 38 when the carrier attempts to retrieve caller ID information about phone call 22 that it will display to Recipient B on Recipient B's phone 14. Caller ID application 18 may reside on the local phone device 14, or a telecom phone system 37 component, or be accessible via the telephone network 16. Phone device 14 and caller ID application 18 also have access to a data source 20 (as a database or an accessible telephone history) that may reside on the local device 14, a local server, a local network, or somewhere within telecom phone systems 37, phone system 38, or a third-party system accessible by telephone network 16. Regardless of where data source 20 resides, whether it takes the form of a traditional database or an accessible telephone call history, or how data source 20 components are accessed, data source 20 is operatively coupled to caller ID application 18.

In any arrangement of the data source 20 (as a database or an accessible telephone call history) and caller ID application 18, telephone 12 is configured to send voice call(s) 22 from Caller A to Recipient B, and more particularly between telephones 12 and 14 which are operated or otherwise controlled by Caller A and Recipient B, respectively. Receiver B's phone 14 is a telephone network-16-enabled device such as a traditional telephone, mobile phone, IP phone, or other type of phone. Receiver B's phone device 14 has access to caller ID application 18. Names of phone call recipients, phone number(s) 24, and other relevant information about a plurality of contacts are stored in data source 20 (as a database or an accessible telephone call history). Data source 20 is operatively coupled to sequence identifier 26. The function of sequence identifier 26 is to enumerate each phone call from Caller A to each of Caller A's recipient contacts and to maintain a component of data source 20 (as a database or an accessible telephone call history) for each contact, such that every successive phone call from Caller A to each of its contacts is identified by the next value in a predictable sequence that is, preferably, intuitively known and understood in the recipients' language and/or culture. In the example in FIG. 1, this predictable sequence consists of the standard Arabic whole numbers, and the number 76 represents the most recent sequence marker from the phone calls that have previously been sent from Caller A to Recipient B. In this example, the number 77 represents the next sequence marker 30 that would be used in the caller ID of a future phone call 22 being made from Caller A to Recipient B. Since the present invention has been designed to facilitate human recognition and human convenience, in this embodiment, Caller A's sequence identifier 26 for its phone calls with Recipient B consists of a simple incrementing Arabic numerical sequence. (In the first phone call from Caller A to Recipient B, a starting phone call sequence number would have to be used. This starting sequence number could be the Arabic numeral 1 or could be another number used to start a sequence.)

Recipient B may notice that the sequence marker for the most recent phone call was 76, and that, therefore, the sequence marker for the next legitimate and expected phone call from Caller A should be 77.

Alternative sequences from the sender's and recipient's language and culture would also operate effectively as other embodiments within the present invention: for example, Roman numerals, an alphabet, or a sequence derived from the words to a familiar poem or song.

Another embodiment may utilize multimedia such as images to augment caller ID information. Therefore would be able to expand the range of potential sequence markers significantly: for example, pictures or icons could be used to display a recognizable sequence.

In this embodiment of the present invention, callers also use process 2, which is an application or script used in conjunction with caller ID application 18 to create and send voice calls.

Therefore, for the present invention, the caller ID application 18 that creates the single line of characters for the caller ID information would execute an alternative process 2 that programmatically inserts an appropriate next sequence marker 30 within the caller ID information displayed to Recipient B. Thus, the next sequence marker 30 becomes embedded within and is part of caller ID information 36.

In addition to placing the next sequence marker 30 within the caller ID information 36 of the phone call 22, the next sequence marker 30 could be inserted anywhere within the portion of the caller ID information visible to the recipient upon receiving the phone call on phone 14 or otherwise being presented with the caller ID information transported as part of the phone call. Since in most caller ID applications 18.

The caller ID information line 36 is immediately visible before the phone call is answered, it is the best use of the present invention to have caller ID information 36 for the phone call be the location where the next sequence marker 30 would be inserted manually by Caller A using caller ID application 18, or programmatically using process 2 and caller ID application 18. Using the next sequential marker 30 in caller ID information 36 means it is easier for Recipient B to quickly and more easily identify a potential fraudulent voice call attempt because Recipient B does not need to answer call 22 to see the next sequential marker 30. Application 18 and process 2 are configured to send phone calls from telephone 12 to telephone 14 by extracting information 10 from data source 20 (as a database or an accessible telephone call history) and using the extracted information to fill various fields in phone call 22 before sending the call. For example, the phone number 24 for Recipient B is extracted from data source 20 and inserted into the destination caller ID information for a phone call 22. In another embodiment of the present invention, Caller A manually reads information from data source 20 (as a database or an accessible telephone call history). And manually fills in various fields in phone call 22's caller ID information, including using the next sequence marker 30 in the caller ID information 36 as part of making the phone call. Caller A could read the components of the data source 20 (as a database or an accessible telephone call history) to determine the next sequence marker 30.

In another embodiment of the present invention, Caller A could rely on other methods to track sequence identifier 26 and next sequence marker 30 for Recipient B and other contacts, such as (i) simply using human memory to track these; or (ii) tracking these using a written paper record; or (iii) tracking these using another database, computer application, or computer file stored on telephone 12 or another device or system accessible by Caller A; or (iv) tracking these using another method. In this alternative embodiment, instead of relying on process 2 to programmatically insert the next sequence marker 30, Caller A could manually insert the next sequence marker 30 into the caller ID information 36 to help detect and prevent phone call fraud and phishing attempts by using sequential caller ID numbering.

Application 18, process 2, and data source 20 (as a database or an accessible telephone call history) then operate together to retrieve the last sequence identifier 26 for that recipient from the components in data source 20 and generate a new next sequence marker 30 by, in this embodiment, arithmetically increasing it by one from 76 to 77. Process 2 then updates the sequence identifier for Recipient B in data source 20, if appropriate, and stores or saves the sequence identifier 26, or next sequence marker 30; or both sequence identifier 26 and next sequence marker 30; or a marker, indicator or other data to represent or compute at a later time the value for either sequence identifier 26 or next sequence marker 30, or both; pending retrieval for the next voice call from Caller A to Recipient B. Other database components in Data Source 20 about the history of previously sent calls from Caller A to Recipient B may also be stored in Data Source 20 (as a database 20 or an accessible telephone call history), along with the sequence identifiers and sequence markers; however, if data source 20 takes the form of a telephone call history, then it might not be necessary to store or save information about sequence identifier 26 or next sequence marker 30 in the database components since the telephone call history can simply be read when needed by Caller A or process 2 to determine what the sequence identifier 26 is and what the next sequence marker 30 will be.

The precise communication methods between caller ID application 18 telephone network 16, phone system 37, and phone system 38 are not material for the present invention.

The next sequence marker 30 could be at the beginning of the caller ID information, anywhere within the caller ID information, or at the end of the subject line information. The present invention inserted next sequence marker 30 into phone call 22's caller ID information 36, programmatically by process 2, when phone call 22 was created by Caller A with the interoperable data source 20 (as a database or an accessible telephone call history) and caller ID application 18. In another embodiment of the present invention, the next sequence marker could be inserted into the caller ID information 36 programmatically without Caller A inserting it where an application determines the next sequence marker 30 by referencing the components in data source 20 and creating caller ID information and inserting the next sequence marker 30 within the caller ID information 36.

In further embodiments, other applications running on the telephone networks or interoperating with the telephone networks could have intercepted the call at a later stage and inserted the next sequence 20 marker 30 programmatically, before the call was transported to the recipient, if no sequence marker 30 was found in the caller ID information 36.

Although the next sequence marker 30 could be inserted anywhere within the phone call 22, as described above, if the next sequence marker 30 were located near the beginning of the caller ID information 36, this would be in keeping with protocols for caller ID.

The present invention assists its human users in recognizing and understanding the significance of sequence identifier 26 and sequence marker 30 (which in this embodiment are similar to page numbers). Once the human user has recognized or learned of the significance of the sequence identifier(s), no further or prior specialized knowledge is required. Recipient B may be assisted in understanding that a phone call purporting to be from Caller A but that is lacking either the correct next sequence marker 30 or any sequence marker at all may be a phishing or fraud attempt and should be considered to be suspicious and worthy of further investigation.

This assistance could come if some combination of caller ID application 18, data source 20 (as a database or an accessible telephone call history), and process 2 alerted Recipient B if the next sequential marker 30 that was received as part of a phone call 22 did not match the expected sequential identifier; that is if the sequence were out of order. Caller ID application 18, interoperating with other components, could, for example, change the caller ID alert message to a different color, alert Recipient B using an on-screen message on telephone 14, or otherwise provide a notification to Recipient B that a call might be a potential phishing attempt and should be treated as a suspicious telephone call. Recipient B could also instead manually compare the next sequence marker 30 to sequence identifier 26 to determine whether a call is a potential phishing or fraud attempt. The present invention thus allows the Recipient to detect phone phishing attempts, or other fraudulent voice calls, using sequential numbering within caller ID information and the other components and processes of the present invention.

Figure 2:
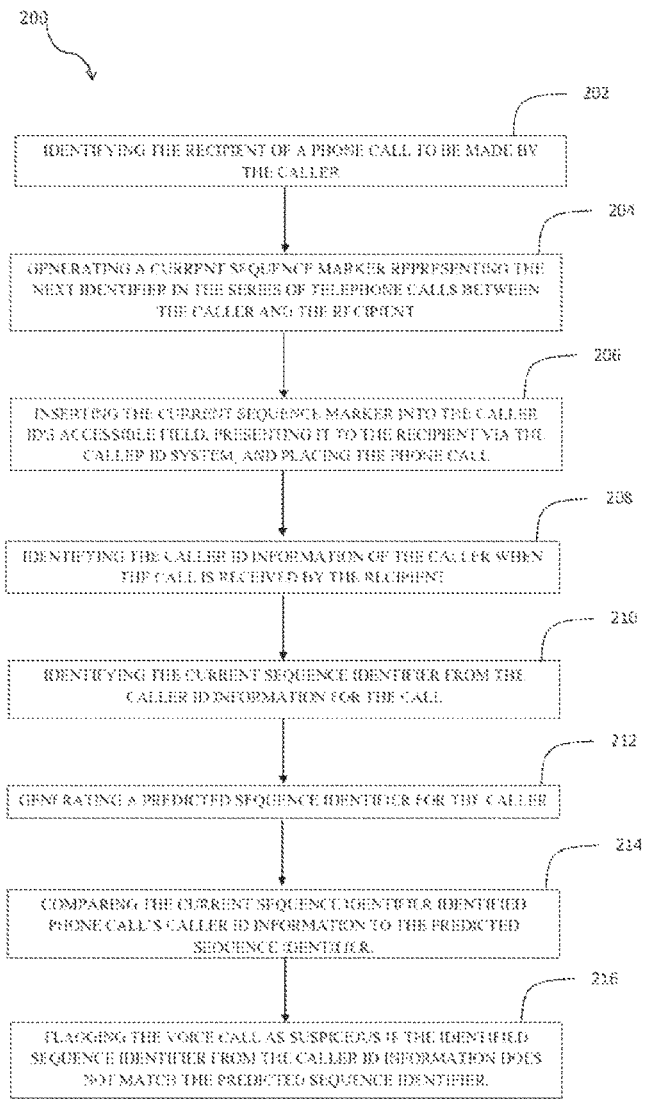
FIG. 2 illustrates a flowchart of the method for verifying the authenticity of telephone calls from a caller's telephone to a recipient, in accordance with another aspect of the present invention.

In another aspect, FIG. 2 illustrates flowchart 200 of a method to verify the authenticity of telephone calls originating from a caller's telephone to a recipient. Said method involves one or more callers and one or more recipients, each having a phone number, and access to a caller ID system with an accessible field for receiving content, the content of the user-accessible field being visible to the recipient upon receiving a phone call, The method, as a first Step 202 involves selecting, by the caller, the intended recipient's phone number or contact information from their directory or address book, either by choosing from stored contacts or manually entering the recipient's phone number. At Step 204, generating, by the caller's system, a current sequence marker that represents the next sequential number in the ongoing series of telephone calls between the caller and the recipient. At Step 206, inserting, by the caller's system, the current sequence marker into the accessible field of the caller ID information, and ensures it is included in the caller ID data presented to the phone call recipient by the caller ID system or a system interoperating with the telephone device and network, and then places the phone call.

Said method further includes, Step 208, the recipient's system identifies the caller ID information associated with the incoming call. This step ensures that the recipient's system can recognize and process the caller ID details provided by the caller. At Step 210, the recipient's system extracts the current sequence identifier from the caller ID information associated with the call. This step allows the recipient's system to obtain the specific sequence marker included by the caller. At Step 212, the recipient's system generates a predicted sequence identifier for the caller. This involves determining the expected next sequence number based on the caller's previous calls.

Said method also includes at step 214, the current sequence identifier from the caller's ID information is compared to the predicted sequence identifier. This step checks for consistency between the expected and received sequence markers. At step 216, the voice call is flagged as suspicious if the sequence identifier extracted from the caller ID information does not match the predicted sequence identifier. This step helps identify potential fraudulent or unauthorized calls. Flagging alerts the recipient to possible security issues with the incoming call. The alerts for potentially suspicious calls where caller ID information does not match the predicted sequence identifier may be presented to the user in one or many modes: a text message displayed to the call recipient on the telephone hardware, or an audio signal presented to the recipient from the telephone hardware, or a flashing light, or coloured lights, or other visual indicators, or an audio message presented to the caller when they pick up the phone handset that warns them the call may be fraudulent, or other means or providing a flag, alert message, or warning to the call recipient.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

I claim:

1. A method of verifying the authenticity of telephone calls sent from a caller's telephone to a recipient, both caller and recipient each having a phone number, and access to a caller ID system with an accessible field for receiving content, the content of the user-accessible field being visible to the recipient upon receiving a phone call, the method comprising the steps of:

identifying the recipient for a phone call to be made by the caller;

generating a current sequence marker for the recipient, the current sequence marker representing the next sequence identifier in a sequence of telephone calls between the caller and the recipient;

inserting the current sequence marker into the accessible field of the caller ID information and including that in the caller ID information presented to the phone call recipient by the caller ID system or the caller ID system interoperating with the telephone device and the telephone system.

2. The method of claim 1, wherein the current sequence marker is generated from a phone call history representing a record of telephone calls previously made from the caller to the recipient.

3. The method of claim 1, wherein the current sequence marker comprises one or more characters selected from the group of sequential characters comprising letters, numbers, words from a sequential list of words, symbols from a sequential list of symbols, icons from a sequential list of icons and images from a sequential list of images.

4. The method of claim 1, wherein the telephone call history is contained in a database coupled to a caller's telephone system.

5. The method of claim 1, wherein the database and caller ID application are configured to programmatically generate the current sequence marker and insert it into an accessible field before transporting the call and the caller ID information.

6. The method of claim 1, wherein the caller's telephone system queries a telephone call history to generate the current sequence marker, the telephone call history representing a record of telephone calls previously sent from the caller to the recipient, the caller then inserts the current sequence marker into the accessible field of the caller ID information before transporting the voice call to the recipient.

7. The method of claim 6, wherein the telephone call history includes a last sequence marker for a last phone call made and sent to the recipient, the telephone system generates the current sequence marker by incrementing the last sequence marker by 1.

8. The method of claim 1, wherein the accessible field into which the current sequence marker is inserted into the caller ID information for a phone call.

9. The method of claim 7 further comprises the steps of the recipient receiving the phone call made by the caller, the current sequence marker being identified from the caller ID information, the current sequence marker then being compared to an expected sequence marker predicted from the last sequence marker, the telephone call being flagged as suspicious if the current sequence marker identified from the call's caller ID information does not match the expected sequence marker.

10. The method of claim 1 wherein the current sequence marker is a human-readable alphanumeric sequence of characters.

11. The method of claim 1 further comprises caller and recipient databases coupled to the caller and recipient's called ID databases containing fields for the telephone numbers of callers and recipients, the last sequence identifier used in a sequence of telephone calls, the current next sequence identifier to be used for the next call in the sequence of telephone calls, the caller ID databases being further configured to automatically update the current sequence identifier in the sender's caller ID database to reflect the making of the phone call when the telephone call is made by the caller, and to automatically update the predicted sequence identifier in the recipient's caller ID database in the event the sequence identifier extracted from the caller ID information for the phone call received matches the predicted sequence identifier fetched from the recipient's caller ID database.

12. The method of claim 1 wherein the caller is within the same telephone system as the recipient.

13. A method of verifying the authenticity of telephone calls sent from a caller's telephone to a recipient, both caller and recipient each having a phone number, and access to a caller ID system with an accessible field for receiving content, the content of the user-accessible field being visible to the recipient upon receiving a phone call, the method comprising the steps of:
 identifying the receiver for a phone call to be made by the caller;
 generating a current sequence marker for the recipient, the current sequence marker representing the next sequence identifier in a sequence of telephone calls between the caller and the recipient;
 inserting the current sequence marker into the accessible field of the caller ID information and including that in the caller ID information presented to the phone call recipient by the caller ID system or the caller ID system interoperating with the telephone device and the telephone system and then placing the phone call;
 identifying the caller ID information of the caller when the call is received by the recipient;
 identifying the current sequence identifier from the caller ID information for the call;
 generating a predicted sequence identifier for the caller;
 comparing the current sequence identifier identified phone call's caller ID information to the predicted sequence identifier, and
 flagging the voice call as suspicious in the event the sequence identifier identified from the caller ID information for the call does not match the predicted sequence identifier, by displaying warning messages in text presented to the call recipient and displayed on the phone hardware, in real-time as the phone call is received, or by presenting the call recipient with an audio message, before the call is answered to warns the recipient that the call about to be answered may not be verifiable and may be suspicious or fraudulent, or by using other alert indicators such as a differentiated or unique ring tone, a flashing light on the telephone, colored lights on the phone, an audio signal from the phone, or other warning messages.

14. The method of claim 13, wherein the accessible field into which the current sequence identifier is inserted is configured such that the recipient can view the current sequence identifier simply by reading the field without having to answer the phone call when it is received, the recipient's telephone or the recipient's telephone coupled with the recipient's telephone system or caller ID system, the telephone is configured to flag the voice call as suspicious if the current sequence marker identified from the caller ID information for the telephone call does not match the expected sequence marker.

15. The method of claim 13, wherein the real-time warning messages include an audio message inserted by the receiving telecom that plays a warning message for the user after the phone is answered but before the call is connected, or the audio message could be superimposed on the existing connection after the call is answered.

16. The method of claim 13, wherein a recipient's caller ID system flags telephone calls as suspicious in the event the sequence identifier identified from the caller ID information for the telephone call does not match the predicted sequence identifier, the recipient having a different telephone system than the email caller.

17. The method of claim 13, wherein a recipient's caller ID system flags telephone calls as suspicious in the event the sequence identifier identified from the caller ID information for the telephone call does not match the predicted sequence identifier, and the caller ID system, caller ID database, and the recipient's telephone system retaining a record of potentially fraudulent or phishing voice calls, or other calls where the sequence identifiers do not match, thereby enabling telecom providers, other caller ID systems, enhanced caller ID systems, regulators, and other telephone systems to help analyze behaviors and patterns in caller ID spoofing and validate telephone call histories of potentially fraudulent callers, User-reported fraudulent telephone calls may also be retained in the record of voice calls.

18. The method of claim 13, wherein a recipient's caller ID system flags telephone calls as suspicious in the event there is incomplete caller ID information for the telephone or there is no caller ID information for a telephone call, or there is problematic caller ID information from calls passing between incompatible telephone systems or jurisdictions, or where caller ID information is blocked and flagging the telephone call as not verifiable and potentially fraudulent.

19. A caller ID system for tracking a plurality of telephone calls from a caller to a recipient, the telephone calls each having a phone number and access to an accessible field, the caller ID system comprises:
    a caller's telephone operatively coupled to a caller ID database, the system configured to send caller ID information with telephone calls to the recipient, the caller ID database configured to store contact information for the recipient including the recipient's telephone number and a sequence identifier, the sequence identifier representing a last predicted value in a previously agreed-upon sequence of telephone calls between the caller and recipient, the caller ID database and the caller ID system configured to insert the sequence identifier for the recipient in the accessible field the caller ID information sent with every phone call to each recipient, the caller ID database is further configured to update the sequence identifier for the recipient in the caller ID database when each phone call is sent to the recipient;
    a recipient telephone operatively coupled to a recipient's caller ID database, the recipient caller ID application configured to receive said plurality of telephone calls from the caller, the recipient database configured to store contact information for the caller including the caller's telephone number and the sequence identifier, the recipient called ID system configured to parse the caller ID information to extract the sequence identifier from the accessible field of the caller ID information sent from the caller to generate an extracted sequence identifier, the recipient caller ID system and recipient database being further configured to fetch the sequence identifier for the caller from the database and compare the extracted sequence identifier to the fetched sequence identifier and flag the voice call as suspicious if the extracted sequence identifier does not match the fetched sequence identifier;
    parsing the caller ID information for the phone call to extract the current sequence identifier;
    identifying the caller of the telephone call in a recipient database and fetching a predicted sequence identifier from the recipient database for the caller;
    comparing the current sequence identifier extracted from the caller ID information from the phone call to the predicted sequence identifier fetched from the recipient database, and
    Flagging the voice call as suspicious in the event the sequence identifier extracted from the caller ID information does not match the predicted sequence identifier fetched from the recipient database.

20. A caller ID system for receiving telephone calls sent from a caller in a telephone system to a recipient within a telephone system, the telephone calls each having a caller's telephone number, a recipient's telephone number, and one or more accessible fields, the caller ID system comprising:
    the recipient telephone operatively coupled to a recipient database of telephone contacts, the recipient database configured to store contact information for the recipient including the caller's telephone number and a sequence identifier, the sequence identifier representing a last predicted value in a previously agreed-upon sequence of telephone calls between the caller and recipient, the recipient database and the recipient telephone configured to inspect the incoming voice call and identify the sequence identifier for the caller in the accessible field of the caller ID information for each call made to the recipient, the recipient database being further configured to update the sequence identifier for the caller in the recipient database when each call is made to the recipient;
    a recipient telephone operatively coupled to a recipient database, the recipient called ID application configured to receive said plurality of telephone calls from callers, the recipient database configured to store contact information for the recipient including the caller's telephone number and the sequence identifier, the recipient caller ID application and recipient database configured to parse the caller ID information for the telephone call to extract the sequence identifier from the accessible field of the caller ID sent from the caller to generate an extracted sequence identifier, the recipient caller ID application and recipient database being further configured to compare the extracted sequence identifier to the predicted sequence identifier in the recipient database and then either flag the telephone call as suspicious if the extracted sequence identifier does not match the predicted sequence identifier or, if this is the first sequence identifier ever received in a phone call from the caller, to update the sequence identifier in the database so future telephone calls can be validated using sequential numbering and the other components and processes of the present invention;
    parsing the accessible field of the caller ID information for the phone call to extract the current sequence identifier from the call;
    comparing the current sequence identifier extracted from the caller ID information to the predicted sequence identifier fetched from the recipient database, and either flagging the telephone call as suspicious in the event the sequence identifier extracted from the caller ID information does not match the predicted sequence identifier fetched from the recipient database or, if this is the first sequence identifier ever received from the caller, to update the sequence identifier in the recipient database so future telephone calls can be validated using sequential numbering and the other components and processes of the present invention; and
    in the event a sequence identifier cannot be parsed or extracted from the caller ID information for a telephone call, flagging that telephone call as not conforming to the method of using sequential caller ID numbering, and thus as not verifiable or possibly suspicious.

* * * * *